United States Patent
Kim

(10) Patent No.: US 9,645,331 B1
(45) Date of Patent: May 9, 2017

(54) OPTICAL MODULE DEVICE AND METHOD OF MANUFACTURING THE SAME

(71) Applicant: Yottahn, Inc., Palo Alto, CA (US)

(72) Inventor: Hyogyeom Kim, Osan (KR)

(73) Assignee: Yottahn, Inc., Palo Alto, CA (US)

(*) Notice: Subject to any disclaimer, the term of this patent is extended or adjusted under 35 U.S.C. 154(b) by 0 days.

(21) Appl. No.: 15/263,135

(22) Filed: Sep. 12, 2016

(51) Int. Cl.
G02B 6/42 (2006.01)
G02B 6/34 (2006.01)
G02B 6/26 (2006.01)

(52) U.S. Cl.
CPC .......... *G02B 6/4243* (2013.01); *G02B 6/26* (2013.01); *G02B 6/34* (2013.01); *G02B 6/4206* (2013.01); *G02B 6/4214* (2013.01); *G02B 6/4224* (2013.01); *G02B 6/4239* (2013.01)

(58) Field of Classification Search
None
See application file for complete search history.

(56) References Cited

U.S. PATENT DOCUMENTS

| | | | |
|---|---|---|---|
| 8,262,297 B2 * | 9/2012 | Castagna | G02B 6/4292 385/52 |
| 9,383,530 B2 * | 7/2016 | Ootorii | G02B 6/26 |
| 9,423,569 B2 | 8/2016 | Son et al. | |
| 2014/0355934 A1 * | 12/2014 | Shao | G02B 6/428 385/33 |
| 2016/0282570 A1 * | 9/2016 | Nishimura | G02B 6/423 |

FOREIGN PATENT DOCUMENTS

| KR | 10-1480025 B1 | 1/2015 |
|---|---|---|
| KR | 10-1502318 B1 | 3/2015 |

* cited by examiner

*Primary Examiner* — Ryan Lepisto
*Assistant Examiner* — Erin Chiem
(74) *Attorney, Agent, or Firm* — McGuireWoods LLP

(57) ABSTRACT

An optical module device including optical devices 110, a substrate 100 on which the optical devices 110 are disposed, optical fibers 200 that implement optical communications with the optical devices 110, an optical bench 300 to which the optical fibers 200 are fixed and which implements optical coupling between the optical devices 110 and the optical fibers 200, a cover block 400 that covers the optical bench 300 and a copper cable receptacle 500.

18 Claims, 10 Drawing Sheets

OPTICAL MODULE DEVICE AND METHOD OF MANUFACTURING THE SAME

BACKGROUND

1. Field of the Disclosure

The present disclosure relates to an optical module device and a method of manufacturing the same.

2. Discussion of Related Art

As various multimedia services have emerged recently, the necessity for exchanging a large capacity of information has increased such that the quantity of data to be transmitted via a network has also increased. In particular, because of the use of ultra high definition (UHD) televisions (TVs), the transmission capacity limit of the conventional copper wire has been reached. Thus, optical fiber-based signal transmitting methods are being applied in actuality. Because the operation of the optical fiber is not subject to electromagnetic interference, together with broadband transmission, the optical fiber is widely applied to large-capacity transmission of digital media including the high-definition digital video display device that requires large-capacity data transmission.

An optical module device is a data receiving device that converts optical signals received via the optical fiber into electrical signals or a data transmitting device that converts electrical signals into optical signals and transmits the optical signals via the optical fiber. An optical module device requires alignments to adjust arrangements of elements that constitute the device to minimize loss of optical signals during transmitting or receiving operations. Also, an optical module device employing a plurality of optical fibers has a disadvantage in that an optical distortion phenomenon such as optical crosstalk between the optical fibers occurs.

SUMMARY OF THE DISCLOSURE

The present disclosure is directed to an optical module device that minimizes loss of optical signals and simultaneously reduces manufacturing cost by reducing the thickness of the optical module device and simplifying the structure of the optical module device and to a method of manufacturing the optical module device.

The present disclosure is also directed to an optical module device that minimizes active optical alignment of a plurality of channels so that assembly time can be reduced and to a method of manufacturing the optical module device.

The present disclosure is also directed to an optical module device that minimizes error associated with alignments of components and to a method of manufacturing the optical module device.

According to an aspect of the present disclosure, there is provided an optical module device including: one or more optical devices; one or more optical fibers configured to implement optical communications with the one or more optical devices; a substrate on which the one or more optical devices and an integrated circuit (IC) device for driving the one or more optical devices are mounted at a set position of the top surface of the substrate; an optical bench including a bench body, a seating groove into which the one or more optical fibers are inserted in the lengthwise direction and seated, and an optical unit that is formed at an end of the seating groove and facing the one or more optical fibers face to concentrate light transmitted between the one or more optical devices and the one or more optical fibers and change the direction of the concentrated light; and a cover including a cover body corresponding to the bench body, a lens assembly configured to include one or more lenses corresponding to the one or more optical fibers and to concentrate light transmitted between the optical unit and the optical fibers, a retainer from which a bottom surface of the cover body protrudes at a position corresponding to the seating groove and which holds the one or more optical fibers, and an injection port formed through the retainer from a top surface of the cover body, the cover configured to be coupled to the optical bench.

According to another aspect of the present disclosure, there is provided a method of manufacturing the optical module device, the method including: providing a substrate having a top surface on which wirings are printed at positions where the one or more optical devices and the IC device are to be disposed and the reference marks for alignment of the optical bench are printed; mounting each of the one or more optical devices and the IC device on the wirings; installing the optical bench on the substrate based on the reference marks and aligning the optical bench; coupling the cover to the optical bench; inserting the one or more optical fibers into a space between the seating groove and the retainer; adjusting an optical path of each of the one or more optical fibers; and injecting an adhesive through the adhesive injection port and hardening the adhesive.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
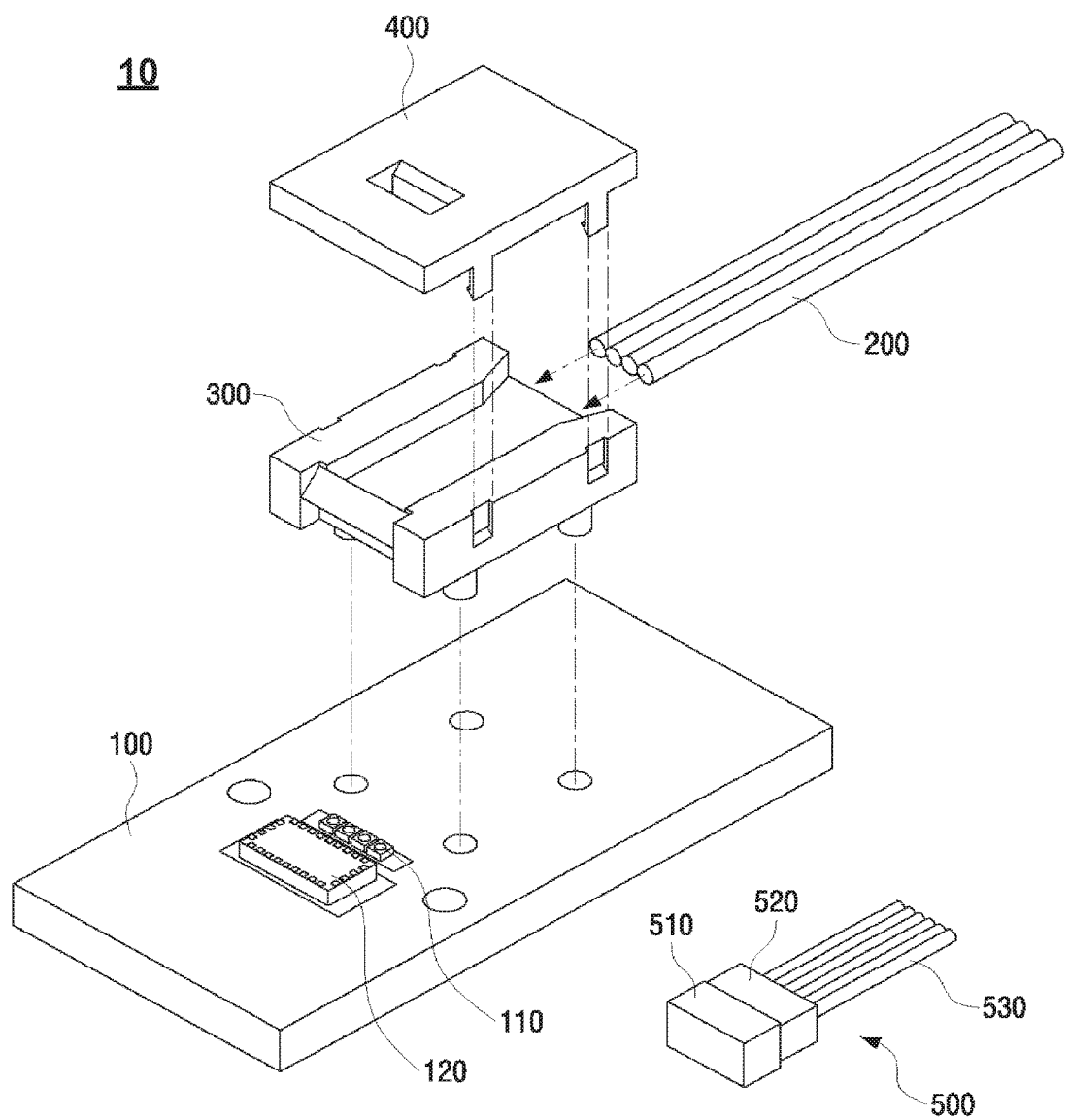
FIG. 1 is an exploded perspective view of an optical module device according to an embodiment of the present disclosure.

The present disclosure is further described in the detailed description that follows.

DETAILED DESCRIPTION OF EXEMPLARY EMBODIMENTS

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 is an exploded perspective view of an optical module device 10 according to an embodiment of the present disclosure.

As illustrated in FIG. 1, the optical module device 10 includes one or more optical devices 110, a substrate 100 on which the one or more optical devices 110 may be disposed, one or more optical fibers 200 that implement optical communications with the one or more optical devices 110, an optical bench 300 to which the one or more optical fibers 200 may be fixed and which may implement optical coupling between the optical device(s) 110 and the optical fiber(s) 200, a cover 400 that covers the optical bench 300 and a cable receptacle 500.

Figure 2:
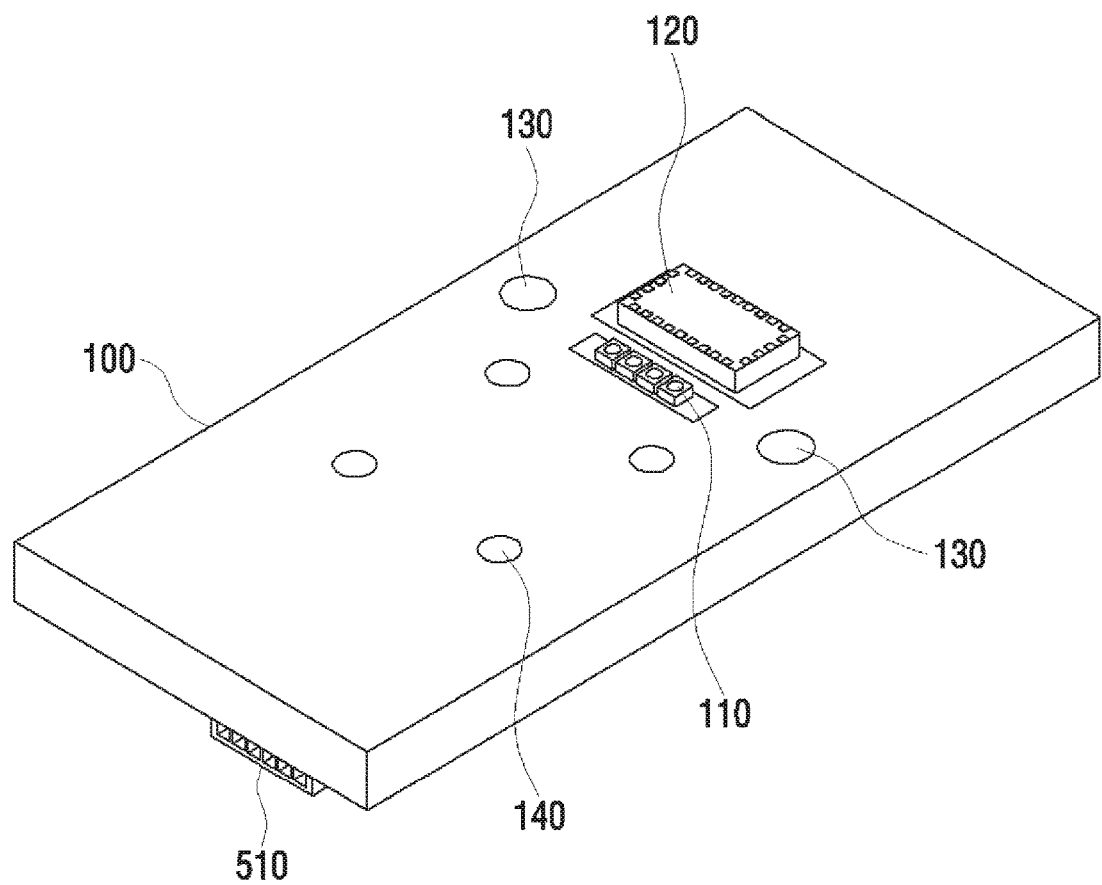
FIG. 2 is a perspective view of a substrate of the optical module device of FIG. 1.

FIG. 2 is a perspective view of the substrate 100 of FIG. 1.

As illustrated in FIG. 2, the substrate 100 includes, on a first (e.g., top or bottom) surface of the substrate 100, the one or more optical devices 110, an integrated circuit (IC) device 120 for driving the optical devices 110, and one or more reference marks 130 for arranging elements to be coupled to the substrate 100. The substrate 100 may include a printed circuit board (PCB), for example. Wiring for coupling the optical devices 110 to the IC device 120, and the reference marks 130 may be printed on the substrate 100 at time of manufacturing or production. The substrate 100 may include one or more leg insertion holes 140 into which legs 350 (shown in FIG. 3) may be inserted for fixing the optical bench 300 (shown in FIG. 3) to the substrate 100.

The optical devices 110 may include light-emitting devices when an optical module is an optical transmitter. The light-emitting devices may include, for example, light emitting diodes (LEDs), laser diodes, or the like.

The optical devices 110 may include photodetectors when the optical module is an optical receiver. The photodetectors may include, for example, photodiodes, or the like.

The optical devices 110 may include both light emitting devices and photodetectors for bidirectional communication.

The number of optical devices 110 may be based on the number of optical fibers 200, so that, for example, the number of optical devices 110 is the same as the number of optical fibers 200. A ribbon-slot-shaped optical fiber may be formed by, for example, coupling four optical fibers 200. When a ribbon-slot-shaped optical fiber is employed, four optical devices 110 may be disposed separated by a distance corresponding to the separation between the optical fiber cores.

The IC device 120 is a circuit for driving the optical devices 110. Signals may be applied to the IC device 120 to drive the optical devices 110 to emit light, which would be emitted according to electrical drive signals input to the optical devices 110.

Referring to FIGS. 1 and 2, when a hybrid cable, that includes, for example, a copper wire, is to be coupled to one or more of the optical fibers 200, a receptacle 510 (shown in FIG. 2) may be installed on a second (e.g., bottom or top) surface of the substrate 100. The receptacle 510 may be configured to receive and hold a connector 520 to which a copper cable 530 may be connected or integrally formed. The reference marks 130 may be provided on the substrate 100 and serve as reference points at which the optical bench 300 may be accurately disposed, so that radiated light from the optical devices 110 may efficiently impinge on the optical fibers 200. Positioning of the optical devices 110 and an optical unit 320 (shown in FIG. 3) of the optical bench 300 should be accurate and easily performed so that the radiated light from the optical devices 110 may efficiently and effectively impinge on the optical fibers 200. In other words, the optical bench 300 and the substrate 100 should be coupled to each other in the correct position.

When elements are disposed on the substrate 100 using, for example, pick-and-place equipment (not shown), the elements may be positioned and disposed in their correct positions by checking the reference marks 130 using, for example, optical detectors (not shown). At least two or more reference marks 130 may be formed on the substrate 100 for accuracy. The reference marks 130 may be disposed on the same axis as that of the optical devices 110, with the optical devices 110 being disposed between the reference marks 130, as seen in FIG. 2. The reference marks 130 on the substrate 100 may be formed simultaneously with the formation of the wiring pattern for the optical devices 110 and the IC device 120.

Fiducial marks may be used as the reference marks 130, for example. The reference marks 130 may include, for example, a printed pattern, a groove, a protrusion, a pin, or any other item that may be used for alignment purposes.

The reference marks 130 may be formed with a precision of, for example, about 50 μm in the case where the substrate 100 comprises a glass epoxy PCB, or may be formed with a precision of, for example, about 10 μm in the case where the substrate 100 comprises a ceramic PCB. The reference marks 130 for the optical bench 300 may be formed with a precision on the order of a submicron by a deposition of a metal using a mask, for example. When components are aligned on the substrate 100 using the reference marks 130 formed on the substrate 100, submicron precision may be attained.

The reference marks 130 may include reference grooves for optical alignment, which may be employed by, for example, coupling reference grooves formed on a substrate and legs formed on an optical bench as described, for example, in the Korean Patent Registration No. 1502318. When the reference grooves are formed on the substrate, due to a drill tolerance and processing tolerance during drilling, an error of approximately ±15 μm may occur.

When components are aligned on the substrate 100 using the reference marks 130, as in the embodiment of the present disclosure, misalignment due to a tolerance for forming holes in the substrate 100 may be prevented from occurring. Also, by employing alignment using reference grooves on the substrate and the legs on the optical bench, as discussed above, and employing further alignment using the reference marks 130, precision may be further increased, and a higher-precision manufacturing process may be facilitated.

Figure 3:
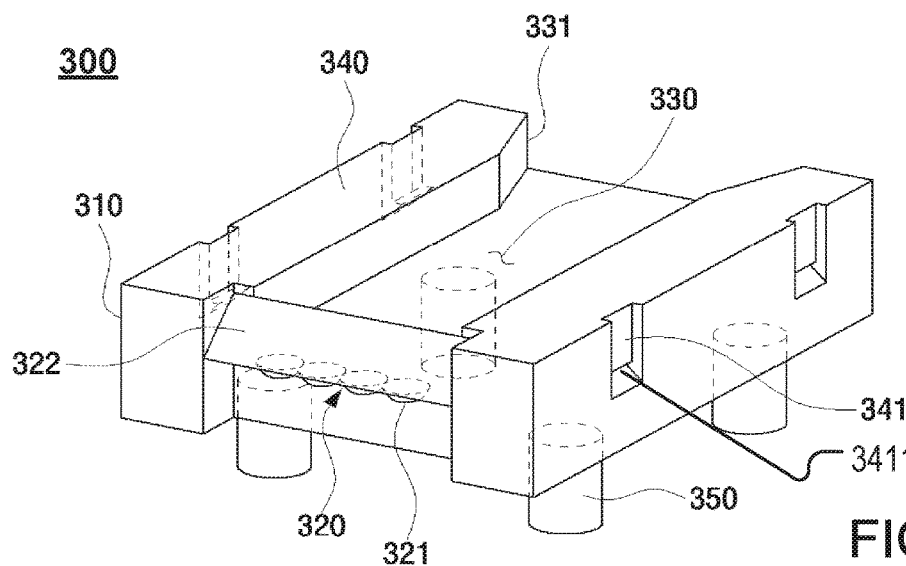
FIG. 3 is a see-through perspective view of an optical bench of the optical module device of FIG. 1.

FIG. 3 is a see-through perspective view of the optical bench 300.

As illustrated in FIG. 3, the optical bench 300 may include a bench body 310, the optical unit 320 that concentrates the radiated light from the optical devices 110 and delivers the concentrated light to the optical fibers 200, a seating groove 330 on which the optical fibers 200 may be seated, sidewall parts 340 formed at opposing (e.g., right and left) sides of the seating groove 330, and legs 350 that enable the optical bench 300 to be fixed to the substrate 100. The bench body 310 may include, for example, a block-shaped body, as seen in FIG. 1.

The seating groove 330 may be formed in a region that is central with respect to a lengthwise direction of the bench body 310 so that the optical fibers 200 may be seated therein. The width of the seating groove 330 may be set to correspond to an aggregate width of the diameters of each of the optical fibers 200 to be seated (or inserted). The surface of the seating groove 330 may include one or more shaped grooves (not shown), such as, for example, a triangle (^) shape, a semi-circle shape, or a "U" (∩) shape, or any other shape that may serve to hold, or facilitate holding a corresponding optical fiber 200 in the seating groove 330. When a ribbon-slot-shaped optical fiber obtained by coupling four optical fibers in parallel is used as in the instant embodiment, the width of the seating groove 330 may be determined by multiplying the diameter of each of the optical fibers 200 by 4 and adding a predetermined margin to the multiplication result (optical fiber diameter×4+margin). A proper margin may be determined in such a way that the optical fibers 200 are easily seated (or inserted) into the seating groove 330 and do not move after being seated. The depth of the seating groove 330 may be larger than the diameter of each of the optical fibers 200.

The body 310 may include one or more insertion ports 331 into which the optical fibers 200 may be inserted. The insertion ports 331 may be formed to have tapered sides such that each of the insertion ports 331 has a larger width than that of the seating groove 330 and tapers inward to a width of the seating groove 330. The insertion ports 331 may be formed to guide the optical fibers 200 into the seating groove 330 when the optical fibers 200 are being inserted into the bench body 310. The sidewall parts 340 that form wall surfaces of the seating groove 330 may be formed at opposing (e.g., right and left) sides of the seating groove 330.

Figure 4:
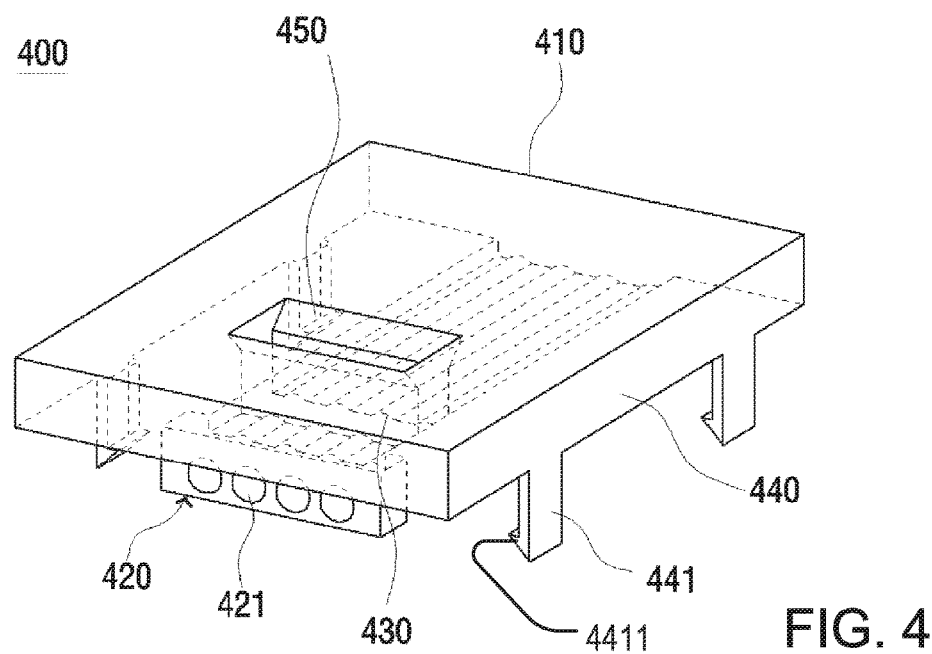
FIG. 4 is a see-through perspective view of a cover block of the optical module device of FIG. 1.

The bench body 310 may include one or more fastening grooves 341 that may be configured to receive corresponding one or more ports 441 of the cover 400 (shown in FIG. 4). The fastening groove 341 may include a recess 341 to receive a protrusion 4411 to securely engage and hold the port 441. The fastening grooves 341 may be formed, for example, in the outer surfaces of the sidewall parts 340.

The optical unit 320 may be formed at a position proximate where the ends of the optical fibers 200 will be seated. The optical unit may include one or more lenses. The optical unit 320 may include a first lens 321 that may be positioned such that it faces a corresponding light emitting device and/or photodetector of the optical device 110. The optical unit 320 may include a reflector unit 322, which may be formed on the first lens 321 to deflect a radiated light along an optical path of the optical device 110. The reflector unit 322 may be configured to deflect the radiated light by, for example, 90 degrees. A space may be formed between the optical devices 110 and the optical unit 320 so that the first lens 321 is spaced apart from the optical devices 110 by a distance with the highest light-receiving efficiency. The height of the bottom of the seating groove 330 may be set to correspond to the separation distance between the optical devices 110 and the first lens 321. The first lens 321 may include, for example, a convex lens for concentrating light. The reflector unit 322 may include, for example, a prism, a reflector, or a high reflection coating on a reflectance surface. The prism, the reflector, or the reflectance surface may have an inclination angle of, for example, 45 degrees.

The bench body may include one or more legs 350. The legs 350 may serve to install the optical bench 300 on the substrate 100. The legs 350 may be formed in the shape of, for example, pillars, pins, rods, or the like, on the bottom surface of the body 310 at positions corresponding to the positions of the leg insertion holes 140. By coupling the legs 350 and the leg insertion holes 140, the optical bench 300 may be fixed on the substrate 100 at a position suitable for optical coupling.

FIG. 4 is a see-through perspective view of an example of the cover 400, according to the principles of the disclosure.

Figure 5:
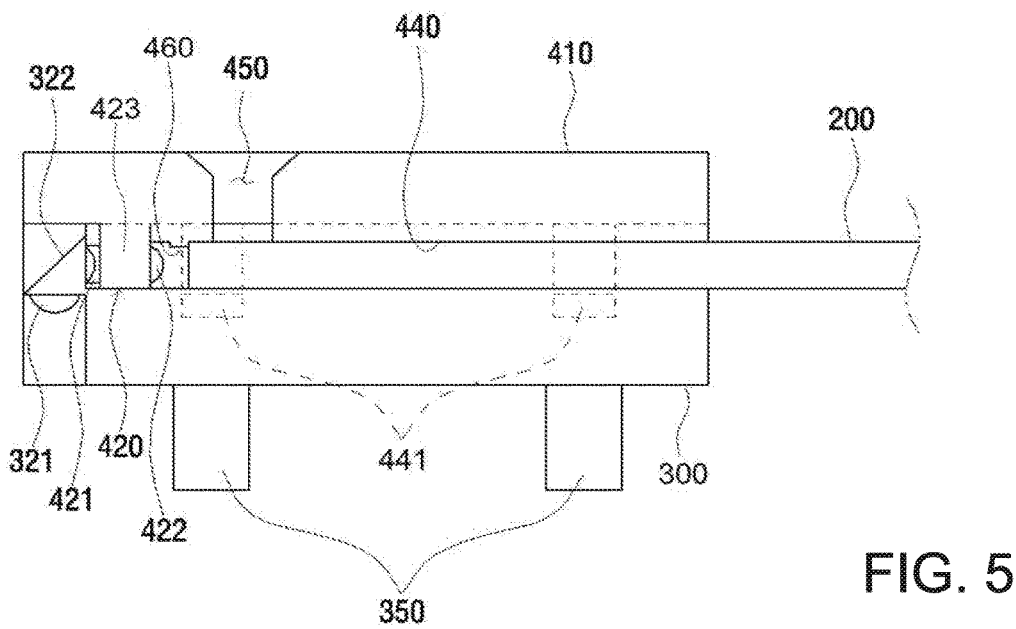
FIG. 5 is a view illustrating a state in which the optical bench of FIG. 3 and the cover block of FIG. 4 are coupled to each other.

FIG. 5 is a cross-sectional view illustrating a state in which the optical bench 300 and the cover 400 are coupled to each other in an embodiment. In the example seen in FIG. 5, the optical module device 10 may function as an optical transmitter.

Figure 6:
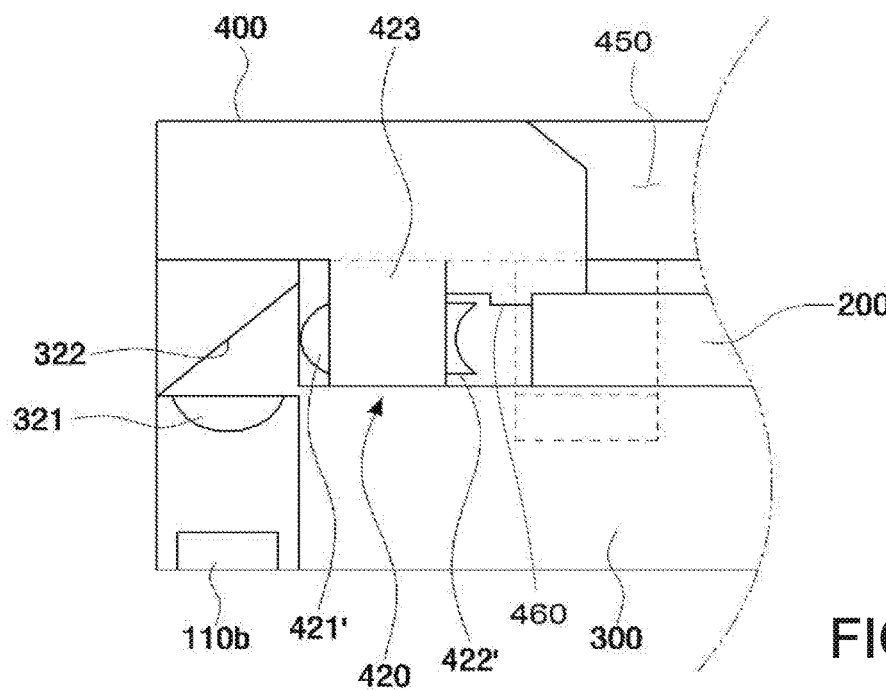
FIG. 6 is a view illustrating a coupling state of an optical module device according to another embodiment of the present disclosure.

FIG. 6 is a cross-sectional view illustrating a state in which the optical bench 300 and the cover 400 are coupled to each other in an embodiment. In the example shown in FIG. 6, the optical module device 10 may function as an optical receiver.

Hereinafter, an example of the cover 400 will be described with reference to FIGS. 4 to 6.

As illustrated in FIG. 4, the cover 400 includes a cover body 410, a lens assembly 420 that concentrates radiated light from the optical devices 110 delivered via the optical unit 320, an injection port 450 through which an adhesive may be injected, a retainer 430 that may hold the optical fibers 200, side walls 440 formed on opposite (e.g., right and left) sides of the retainer 430, and a step jaw (or optical fiber stop) 460 that may limit the positions of ends of the optical fibers 200. According to an aspect of the disclosure, an adhesive (not shown) may be injected through the injection port 450 to securely affix the components in the optical module device 10 to each other including, for example, the optical bench 330, optical fibers 200, and/or cover 400. The retainer 430 may be formed to have substantially the same width as that of the seating groove 330 for being disposed on the seating groove 330.

The retainer 430 may include one or more shaped grooves, such as, for example, a triangle (^) shape, a semi-circle shape, a "U" (∩) shape, or any other shape that may serve to hold, or facilitate holding a corresponding optical fiber 200 in the seating groove 330 (shown in FIG. 3). It is noted that the seating groove 330 may include shaped grooves (not shown), corresponding to the shaped grooves in the retainer 430. The number of grooves in the retainer 430 (and/or seating groove 330) may correspond to the number of optical fibers in the lengthwise direction of the optical fibers 200. The height of a bottom surface of the retainer 430 may be set in such a way that the optical fibers 200 are each held in the plurality grooves (for example, ^- or ∩-shaped grooves). The bottom surface of the retainer 430 may be constructed to have step-like configuration (not shown) so as have a portion that protrudes between the bottom surfaces of the side walls 440 so that the retainer 430 may be inserted and fitted in the seating groove 330 and the sidewall parts 340 of the optical bench 300, so as to provide a substantially snug, secure fit.

The injection port 450 may be formed through the top surface of the cover body 410. The injection port 450 may be formed to have the same width as that of the retainer 430. The injection portion 450 may be formed to be spaced a set distance apart from the ends of the optical fibers 200 inserted into the seating groove 330. An adhesive such as, for example, epoxy may be injected through the injection port 450 so that the optical fibers 200 inserted into the seating groove 330 may be fixed to the optical bench 300 to prevent movement. When an adhesive is injected into the cavity formed by the optical bench 300 and cover 400, the adhesive will flow between the individual optical fibers 200, as well as between the optical fibers 200 and the grooves of the retainer 430 (and/or the seating groove 330) due to capillary action. The injection port 450 may include an inlet that has a tapered shape, as seen in FIG. 5, so as to facilitate efficient delivery of adhesive within the cavity. The injection port 450 may be positioned so that it is located proximate the ends of the optical fibers 200 when the cover 400 is mated to the optical bench 300, as seen in FIG. 5.

The step jaw (or optical fiber stop) 460 may be disposed between the lens assembly 420 and the injection port 450. The step jaw 460 may be formed as a protrusion in which a bottom surface of the cover 400 protrudes. Positions of the ends of the optical fibers 200 are limited by the step jaw 460. The height of the step jaw 460 may be set to correspond to the thickness of a coating layer and the thickness of a cladding layer so that a loss of light incident on the ends of the optical fibers 200 does not occur. The step jaw 460 may be configured to match the shapes of the outlines of the optical fibers 200, so as to provide a seal that prevents adhesive from flowing past the step jaw 460 toward lens assembly 420. Fastening ports 441 that extend from ends of sides of the body 410 are formed at positions corresponding to the fastening grooves 341 of the optical bench 300 so that coupling between the cover 400 and the optical bench 300 may be reinforced. The fastening ports 441 may be formed in the form of hooks 4411 that engage and lock into corresponding grooves 3411 in the bench body 310.

The lens assembly 420 is disposed between the optical unit 320 and the ends of the optical fiber 200. Lenses are disposed for each of the optical fibers 200. The lenses may be aspheric lenses so as to reduce optical aberration. The lenses of the lens assembly 420 may be configured differently depending on whether the optical module device 10 is a receiver or a transmitter. As noted earlier, FIG. 5 shows an example of the lens assembly 420 when the optical module device 10 is an optical transmitter; and, FIG. 6 shows an example of the lens assembly 420 when the optical module 10 is a receiver.

Referring to FIG. 5, the lens assembly 420 may include a second lens 421 disposed to face the reflector unit 322 and a third lens 422 disposed to face the optical fiber 200. The second lens 421 and the third lens 422 may be formed as separate lenses, or as a single less. A concave lens may be used as the second lens 421 to spread out the light reflected by the reflector unit 322, and a convex lens may be used as the third lens 422 to concentrate the light toward the ends of the optical fiber 200. The lens assembly 420 may include a lens bar 423 having one side on which the second lens 421 may be formed (or attached) and another, opposite side on which the third lens 422 may be formed (or attached). The path between the second lens 421 and the third lens 422 may be designed to be an optical path for which optical loss may be minimized.

Referring to FIG. 6, the optical device 110 (denoted as 110b in FIG. 6) may include, for example, one or more photodiodes. The lens assembly 420 may include a convex lens for the second lens 421' and a concave lens for the third lens 422'. The second lens 421' and the third lens 422' may be formed as a single lens, or separate lenses. Other elements are the same as those of the optical transmitter described above with reference to FIG. 5.

Figure 7:
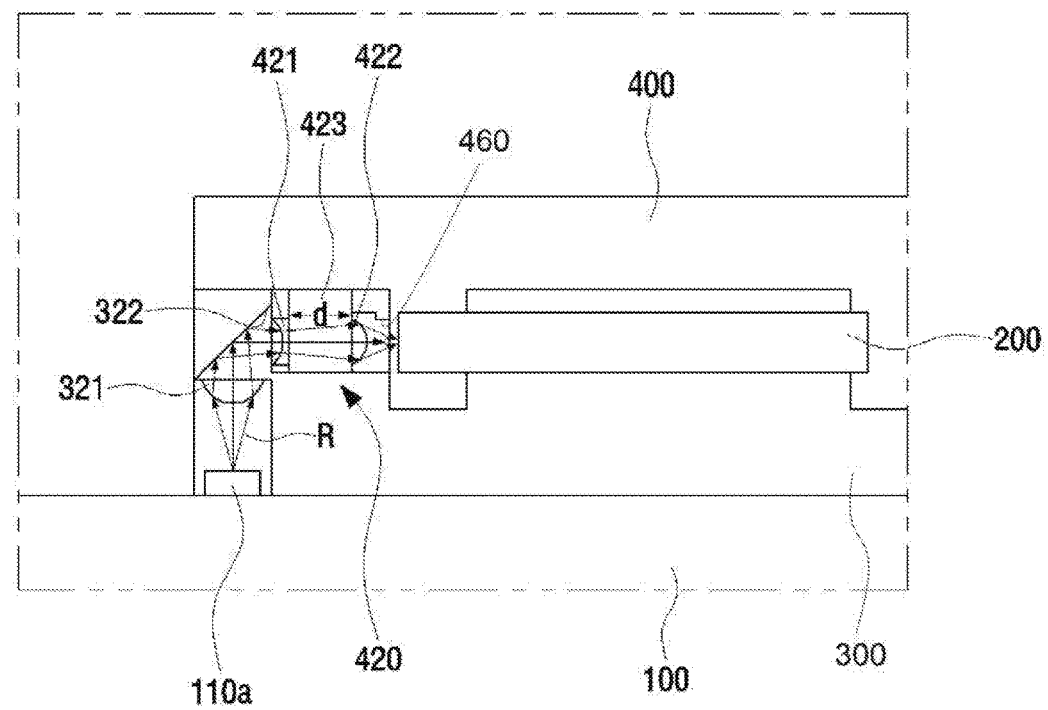
FIG. 7 is a view of an optical path of an optical transmitter according to another embodiment of the present disclosure.
Figure 8:
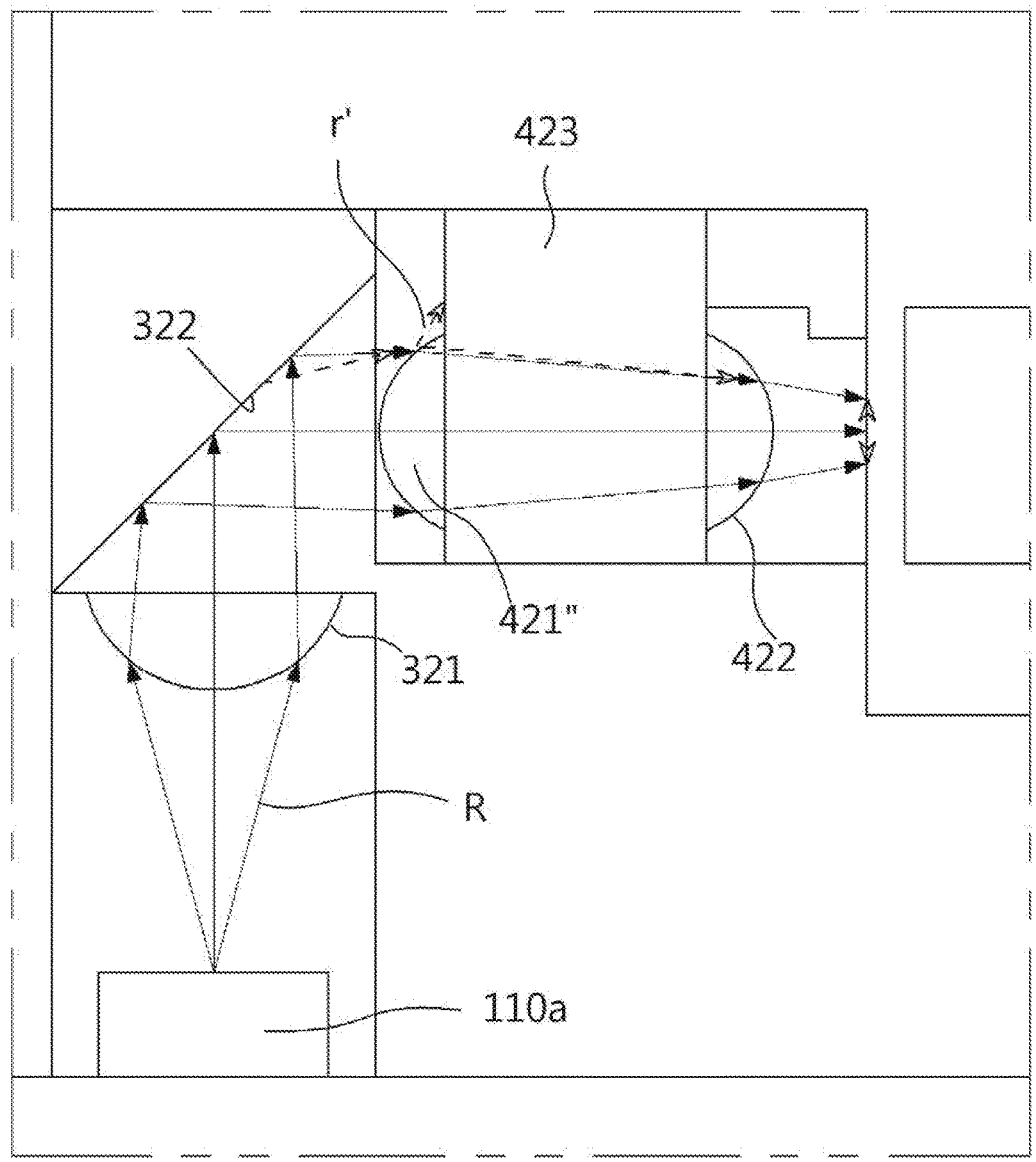
FIG. 8 is a view of an optical path in a comparative example in which only a convex lens is used for concentrating light in the optical transmitter.
Figure 9:
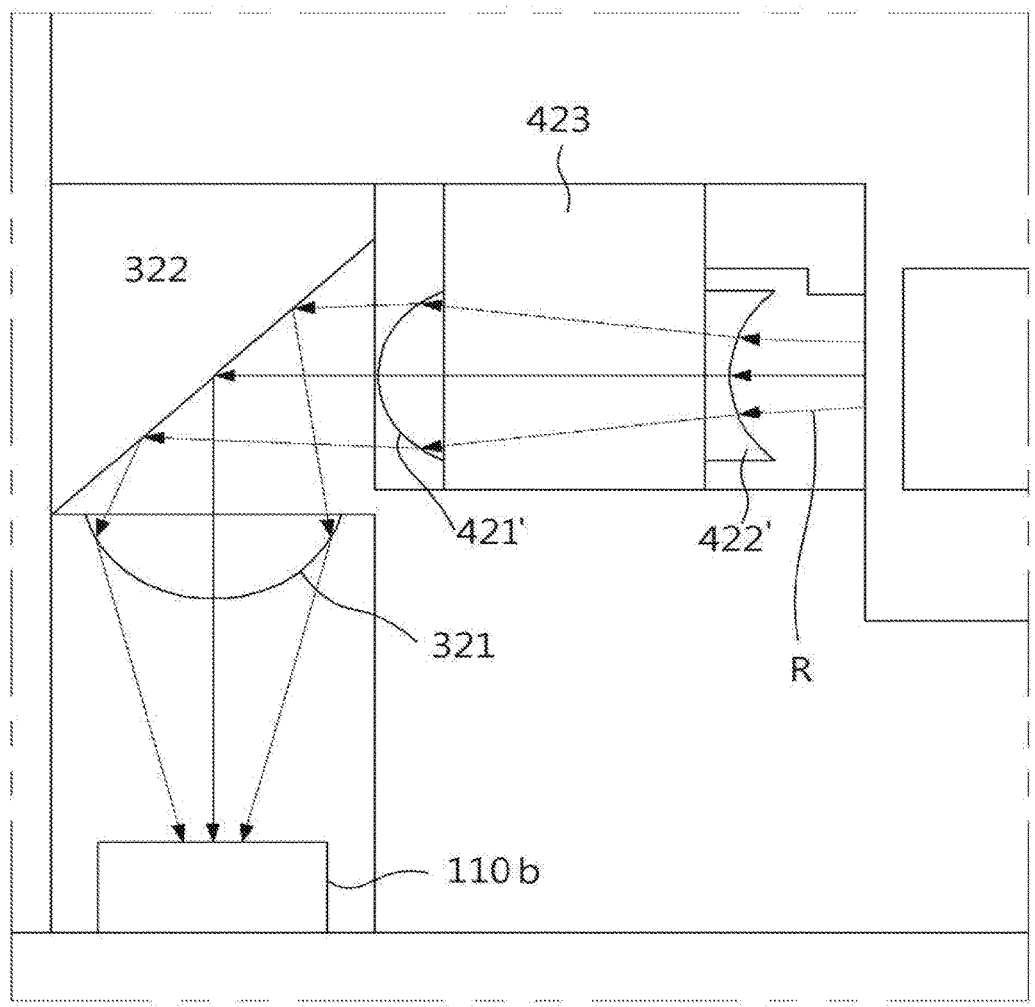
FIG. 9 is a view of an optical path of an optical receiver according to another embodiment of the present disclosure.
Figure 10:
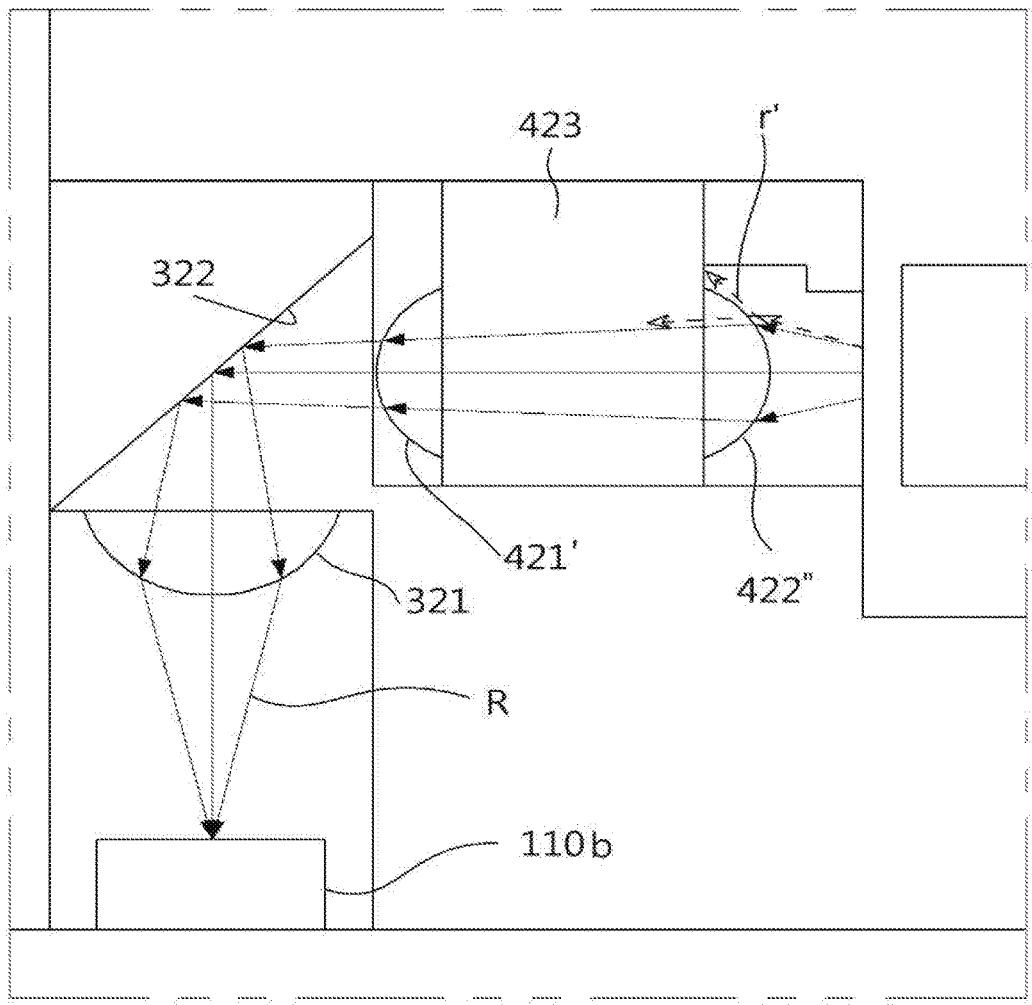
FIG. 10 is a view of an optical path in a comparative example in which only a convex lens is used for concentrating light in the optical receiver.

Hereinafter, an optical path in the optical module device 10 according to the current embodiment of the present disclosure will be described with reference to FIGS. 7 to 10. FIG. 7 illustrates an embodiment of the present disclosure in which the optical module device 10 is configured as an optical transmitter; FIG. 8 illustrates an example in which the optical module device 10 is configured as an optical transmitter; FIG. 9 illustrates an embodiment of the present disclosure in which the optical module device 10 is configured as an optical receiver; and, FIG. 10 illustrates an example in which the optical module device 10 is configured as an optical receiver.

Referring to FIG. 7, when the optical module device 10 is configured as an optical transmitter, radiated light R emitted from the optical devices 110 (denoted as optical devices 110a) is concentrated by the first lens 321, deflected by the reflector unit 322 by, for example, about 90 degrees, and delivered to the second lens 421. As seen, the first lens 321 may be a convex lens and the second lens 421 may be a concave lens. The second lens 421 increases the optical efficiency by emitting the received light, and the third lens 422, which may be a convex lens, concentrates and delivers the received light onto the core of the optical fiber 200. The radiated light of the optical devices 110a is concentrated by the first lens 321 and is further concentrated by the lens assembly 420 so that the angle of incidence of the light incident on the optical fiber(s) 200 is equal to or less than the numerical aperture (NA) of the optical fibers 200.

FIG. 8 illustrates a comparative example against the embodiment of FIG. 7 in which a convex lens is used as the second lens 421" in an optical transmitter. As illustrated, when a convex lens is used as the second lens 421", the ratio of light r' scattered on a surface of the convex lens with respect to light reflected by the reflector unit 322 increases. Due to an increase in scattered light on the surface of the convex lens, an increase in an optical distortion phenomenon such as optical crosstalk, return loss, airy disk, and the like may be confirmed through optical simulation of the comparative example of FIG. 8. As in the embodiment of the present disclosure of FIG. 7, when an aspheric concave lens is used as the second lens 421 in the optical transmitter, an optical distortion phenomenon such as optical crosstalk, return loss, airy disk, and the like may be reduced.

As illustrated in FIG. 9, when the optical module device is configured as an optical receiver, aperture of light received from the optical fibers 200 may be enlarged by the third lens 422', which may be a concave lens, and then, the light may be concentrated by the second lens 421', which may be a convex lens, deflected by the reflector unit 322 by, for example, 90 degrees and delivered to the first lens 321, which may be a convex lens. The first lens 321 may concentrate the transmitted light onto the optical device 110b, which includes one or more photodetectors, and delivers the concentrated light. The light received from the optical fibers 200 may be concentrated once by the lens assembly 420 and concentrated once again by the first lens 321 so that light may be intensely incident on the optical device 110b.

FIG. 10 illustrates a comparative example against the embodiment of FIG. 9 in which a convex lens is used as a third lens 422" in an optical receiver. As illustrated, when a convex lens is used as the third lens 422", the ratio of light r' scattered on a surface of the lens increases. Due to an increase in scattered light on the surface of the convex lens, an increase in an optical distortion phenomenon such as optical crosstalk, return loss, airy disk, and the like may be confirmed through optical simulation of the comparative example of FIG. 10. As in the embodiment of the present disclosure of FIG. 9, when an aspheric concave lens is used as the third lens 422' in the optical receiver, an optical distortion phenomenon such as optical crosstalk, return loss, airy disk, and the like may be reduced.

Figure 11:
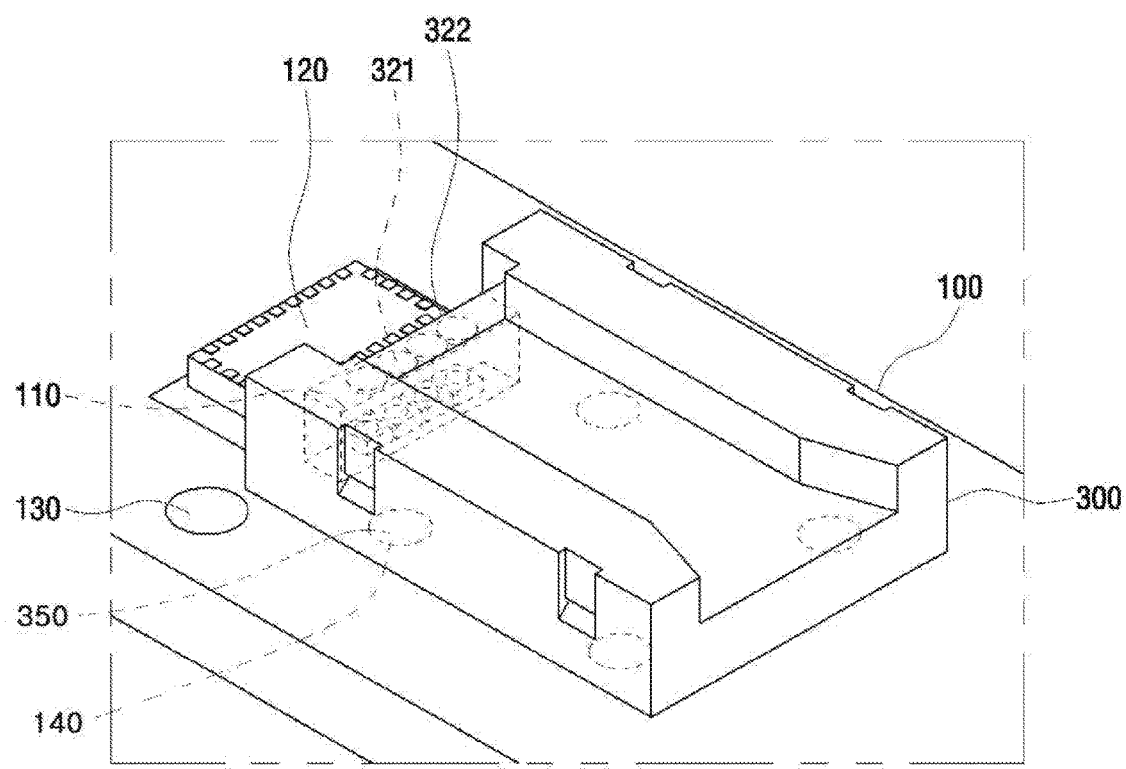
FIG. 11 is a perspective view illustrating a state in which the optical bench of FIG. 3 is mounted on the substrate of FIG. 2.
Figure 12:
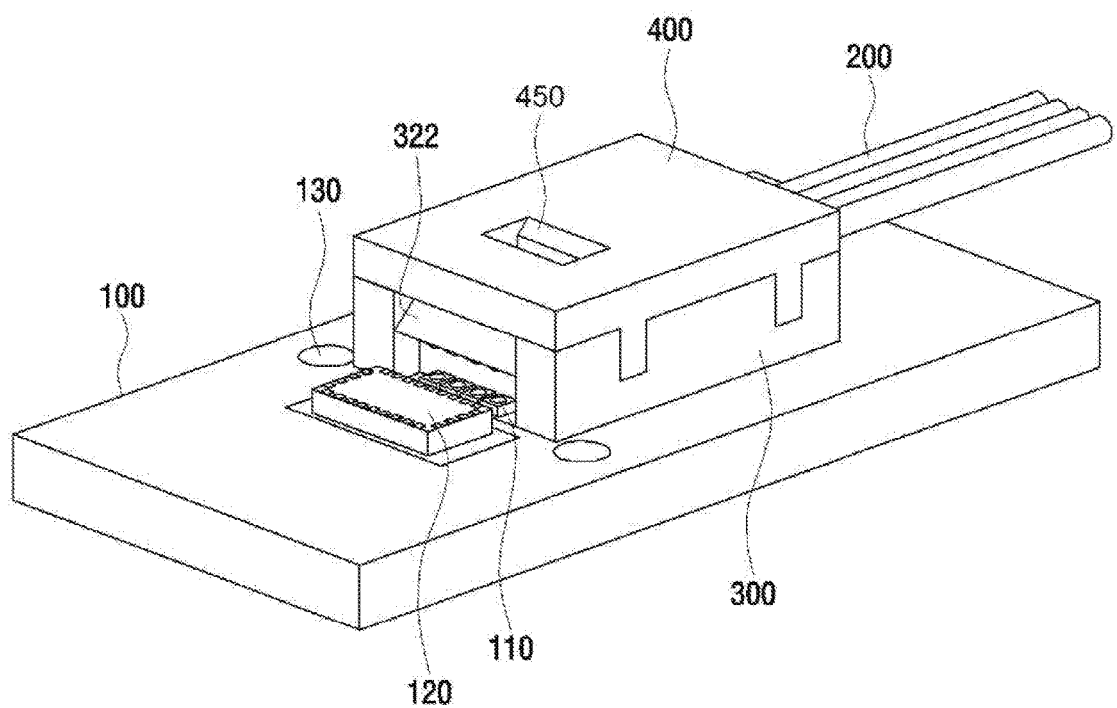
FIG. 12 is a perspective view of an optical module device according to an embodiment of the present disclosure.

FIG. 11 is a perspective view illustrating a state in which the optical bench 300 is coupled to the substrate 100; and, FIG. 12 illustrates a state in which the cover 400 is coupled to the optical bench 300, which in turn is coupled to the substrate 100, and optical fibers 200 are inserted into the cavity formed by the optical bench 300 and cover 400. As in the embodiment of FIG. 11 and FIG. 12, when the legs 350 of the optical bench 300 are inserted into the leg insertion holes 140 of the substrate 100 and alignment of the optical bench 300 is performed based on the reference marks 130, each optical device of the optical devices 110 is disposed to face a corresponding first lens 321 of the optical unit 320. When the cover 400 is coupled to the optical bench 300, the lens assembly 420 is disposed to face the reflector unit 322. When the optical fibers 200 are inserted into the seating groove 330, each end of the optical fibers 200 is disposed to face a corresponding third lens 422 of the lens assembly 420. An optimal optical path may be formed by adjusting the width of the lens bar 423 of the lens assembly 420 and the position of the step jaw 460. When the adhesive is injected through the injection port 450 formed toward the retainer 430 a predetermined distance apart from the position of the step jaw 460 and hardened, the optical fibers 200 may be fixed between the retainer 430 and the seating groove 330.

A method of manufacturing an optical module device according to an embodiment of the present disclosure will be described with reference to FIGS. 11 and 12. First, wiring may be printed on the substrate (or PCB) 100 at positions where the optical devices 110 and the IC device 120 are to be disposed, and the reference marks 130 are preferably printed together with the wiring at this point. The optical devices 110 and the IC device 120 may be coupled to the wiring based on the reference marks 130 using, for example, pick-and-place equipment, or the like. Next, the optical bench 300 may be disposed based on the reference marks 130 using the pick-and-place equipment, or the like. The legs 350 of the optical bench 300 may be inserted into the leg insertion holes 140. In order to increase a fixing force, the legs 350 may be inserted into and coupled to the leg insertion holes 140 after the legs 350 are coated with an adhesive. Alignment of the optical bench 300 may be performed based on the reference marks 130. When the alignment is performed based on the reference marks 130, accuracy may be dramatically enhanced compared to alignment performed only by coupling the leg insertion holes 140 and the legs 350. This is because an alignment error is prevented from occurring due to tolerance errors when the leg insertion holes 140 are formed in the substrate 100. Next, the cover 400 may be coupled to the optical bench 300. The fastening ports 441 may be inserted into the fastening grooves 341 so that the fixing force is increased. When a hook structure, such as, for example, the locking elements 3411 and 4411 is employed, one-touch coupling is possible. Next, the optical fibers 200 may be inserted into the space (or cavity) formed between the seating grooves 330 and the retainer 430. Due to the step jaw 460 formed on the cover 400, the positions of the ends of the optical fibers 200 may be limited so that the optimal optical path may be maintained. The optical fibers 200 may be moved along the longitudinal direction to adjust the optical path. After the optical fibers 200 are inserted, an adhesive may be injected through the injection port 450. After adjusting the optical path of the optical fibers 200, the process of taking the optical fibers 200 out of the seating groove 300 and coating the optical fibers 200 with the adhesive may be omitted. This is conducive to simplification of a process and a reduction in manufacturing cost. Meanwhile, when the optical fibers 200 are a hybrid cable including a copper cable, the receptacle 510 to which the copper cable 530 can be coupled may be installed on a bottom surface of the substrate 100. The arrangement position of the receptacle 510 is not limited to the bottom surface of the substrate 100. The receptacle 510 for the copper cable 530 may be provided so that, when a hybrid cable is used as the optical fibers 200, a process of soldering the copper cable 530 directly onto the substrate 100 can be omitted such that assembly time is reduced and manufacturing cost is reduced.

Glass optical fibers, plastic optical fibers, or the hybrid cable may be used as optical fibers 200 according to the embodiments of the present disclosure.

As described above, according to the embodiments of the present disclosure, an optical module device that can improve efficiency of optical coupling between elements is provided. Also, tolerance of an alignment process can be greatly improved so that the defect rate of products can be reduced, optical alignment can be simplified so that the number of manufacturing processes can be reduced, the thickness of an optical module can be reduced, the structure of the optical module can be simplified, and manufacturing cost of the optical module device can be reduced.

According to the present disclosure, an aspheric concave lens is employed to minimize scattered light and spread out incident light so that an optical distortion phenomenon including optical crosstalk, return loss, airy disk, and the like can be prevented during high-speed light transmission. Also, according to the present disclosure, a triple lens system, including a concave lens, may be employed to obtain larger alignment tolerance so that the process of assembling constituent elements may be facilitated. In addition, according to the embodiments of the present disclosure, processing is simplified so that manufacturing time can be reduced.

The terms "including," "comprising," and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. An optical module device, comprising:
   one or more optical devices;
   one or more optical fibers that communicate with a corresponding one of the one or more optical devices;
   a substrate on which the one or more optical devices and an integrated circuit (IC) device for driving the one or more optical devices are mounted at a set position on the substrate;
   an optical bench comprising a bench body, a seating groove that holds the one or more optical fibers in a lengthwise direction, and an optical unit that is formed at an end of the seating groove, the optical unit having an end that faces the one or more optical fibers to concentrate light transmitted between the one or more optical devices and the one or more optical fibers and to change the direction of the concentrated light; and
   a cover comprising a cover body, a lens assembly that includes one or more lenses corresponding to the one or more optical fibers and that concentrates light transmitted between the optical unit and the optical fibers, a retainer that includes a bottom surface that protrudes from the cover body at a position corresponding to the seating groove to hold the one or more optical fibers, and an injection port formed through the cover body, wherein the cover is configured to be coupled to the optical bench,
   wherein the cover further comprises a step jaw that protrudes from the bottom surface of the cover body between the lens assembly and the injection port, and the step jaw limits a position of the one or more optical fibers.

2. The optical module device of claim 1, further comprising one or more reference marks on the substrate to facilitate alignment of the optical bench.

3. The optical module device of claim 1, wherein the seating groove of the optical bench has a width corresponding to a sum of diameters of the one or more optical fibers and a depth that is equal to or greater than the diameter of the one or more optical fibers.

4. The optical module device of claim 1, wherein
   the retainer comprises one or more grooves having a triangular or "U" shape,
   the number of grooves corresponds to the number of optical fibers, and
   the retainer is configured to hold the one or more optical fibers in the lengthwise direction of the one or more optical fibers.

5. The optical module device of claim 1, wherein the optical unit comprises one or more first lenses disposed to face the one or more optical devices, and a reflector unit that is located proximate the one or more first lenses and changes a direction of light transmitted between the one or more optical devices and the one or more optical fibers.

6. The optical module device of claim 5, wherein the reflector unit comprises a prism disposed at the end of the seating groove, and wherein the first lens is disposed proximate to the prism and having substantially a same height as that of the seating groove.

7. The optical module device of claim 5, wherein the reflector unit comprises a reflectance surface with an inclination angle of about 45 degrees disposed at the end of the seating groove.

8. The optical module device of claim 5, wherein the lens assembly comprises:
   a lens bar that protrudes from a bottom surface of the cover body and is substantially perpendicular to the lengthwise direction of the one or more optical fibers;
   a second lens disposed at one surface of the lens bar facing the reflector unit; and,
   a third lens disposed at another surface of the lens bar facing the one or more optical fibers.

9. The optical module device of claim 8, wherein the second lens comprises an aspheric concave lens, and the third lens comprises an aspheric convex lens.

10. The optical module device of claim 8, wherein the second lens comprises an aspheric convex lens, and the third lens comprises an aspheric concave lens.

11. The optical module device of claim 8, wherein a width (d) of the lens bar is set depending on an optical path of the light.

12. The optical module device of claim 1, wherein a position of the step jaw is set depending on an optical path of the light.

13. The optical module device of claim 1, wherein
   the optical bench comprises one or more legs formed on a surface of the bench body, and
   the substrate comprises corresponding one or more holes, which are formed at positions corresponding to the legs and into which the legs are inserted.

14. The optical module device of claim 1, wherein
   the cover comprises a fastening port formed at a bottom end of a side of the cover body, and
   the optical bench comprises a fastening groove formed on a side of the optical bench that receives and couples to the fastening port.

15. An optical module device, comprising:
   an optical device;
   an optical fiber;
   an optical bench comprising
   a bench body, a seating groove that holds the optical fiber in a lengthwise direction, and an optical unit that faces an end of the optical fiber to concentrate light transmitted between the optical device and the optical fiber and to change a direction of the concentrated light; and a cover comprising a cover body that couples to the bench body, a lens assembly that includes a lens that concentrates light transmitted between the optical unit and the optical fiber, and a retainer that holds the optical fiber, wherein the cover further comprises a step jaw that protrudes from a bottom surface of the cover body between the lens assembly and an injection port, and the step jaw limits a position of the one or more optical fibers.

16. The optical module device of claim 15, further comprising:

a substrate having one or more reference marks to facilitate alignment of the optical bench.

17. The optical module device of claim 15, wherein
the retainer comprises a groove having a triangular shape or a "U" shape, the groove being configured to hold the optical fiber in the lengthwise direction of the optical fiber.

18. The optical module device of claim 15, wherein the optical unit comprises:

a lens disposed to face the optical device; and a reflector unit that is located proximate the lens, wherein the reflector changes a direction of light transmitted between the optical device and the optical fiber.

* * * * *